United States Patent
Kolawa et al.

(10) Patent No.: US 7,877,780 B2
(45) Date of Patent: Jan. 25, 2011

(54) SYSTEM AND METHOD FOR ENFORCING FUNCTIONALITY IN COMPUTER SOFTWARE THROUGH POLICIES

(75) Inventors: Adam K. Kolawa, Bradbury, CA (US); Alexander Z. Smolen, Fullerton, CA (US); Marek M. Pilch, Duarte, CA (US); Wayne P. Ariola, Jr., Los Angeles, CA (US)

(73) Assignee: Parasoft Corporation, Monrovia, CA (US)

( * ) Notice: Subject to any disclaimer, the term of this patent is extended or adjusted under 35 U.S.C. 154(b) by 1022 days.

(21) Appl. No.: 11/352,079

(22) Filed: Feb. 10, 2006

(65) Prior Publication Data

US 2006/0225124 A1    Oct. 5, 2006

Related U.S. Application Data

(60) Provisional application No. 60/667,528, filed on Apr. 1, 2005.

(51) Int. Cl.
*G06F 17/00* (2006.01)

(52) U.S. Cl. ............... 726/1; 717/168; 717/169; 717/170; 717/171; 717/172; 717/173; 717/174; 717/175; 717/176; 717/177; 717/178; 709/220; 709/221; 709/228; 709/242; 726/2; 726/26; 726/27; 726/28; 726/29; 726/30; 713/151; 713/152; 713/153

(58) Field of Classification Search ............... 726/22, 726/1, 10, 25–30, 2; 713/200, 201, 1, 100, 713/187, 164–167, 151–154; 717/140, 120, 717/117
See application file for complete search history.

(56) References Cited

U.S. PATENT DOCUMENTS

| | | | | |
|---|---|---|---|---|
| 6,253,184 | B1 * | 6/2001 | Ruppert | 704/275 |
| 6,523,027 | B1 * | 2/2003 | Underwood | 707/4 |
| 6,779,120 | B1 * | 8/2004 | Valente et al. | 726/1 |
| 6,944,183 | B1 * | 9/2005 | Iyer et al. | 370/466 |
| 6,978,379 | B1 * | 12/2005 | Goh et al. | 726/10 |
| 7,337,105 | B2 * | 2/2008 | Sugimoto | 704/9 |
| 2004/0034767 | A1 * | 2/2004 | Robinson et al. | 713/152 |
| 2004/0083382 | A1 * | 4/2004 | Markham et al. | 713/200 |
| 2005/0160296 | A1 * | 7/2005 | Maeno | 713/201 |
| 2006/0156380 | A1 * | 7/2006 | Gladstone et al. | 726/1 |

* cited by examiner

*Primary Examiner*—Thanhnga B Truong
*Assistant Examiner*—Josnel Jeudy
(74) *Attorney, Agent, or Firm*—Christie, Parker & Hale, LLP

(57) ABSTRACT

A method and system for enforcing functionality in computer software through policy including converting a natural language policy to sample code, wherein the natural language policy is represented by logical patterns; creating one or more static analysis rules from the sample code to enforce the natural language policy at a centralized location of the computer software; and enforcing the created one or more static analysis rules for the computer software.

20 Claims, 8 Drawing Sheets

SYSTEM AND METHOD FOR ENFORCING FUNCTIONALITY IN COMPUTER SOFTWARE THROUGH POLICIES

CROSS-REFERENCE TO RELATED APPLICATION

This patent application claims the benefit of the filing date of U.S. Provisional Patent Application Ser. No. 60/667,528, filed on Apr. 1, 2005 and entitled "SYSTEM AND METHOD FOR ENFORCING FUNCTIONALITY IN COMPUTER SOFTWARE THROUGH POLICIES," the entire content of which is hereby expressly incorporated by reference.

FIELD OF THE INVENTION

The present invention relates generally to computer software; and more particularly to a system and method for enforcing functionality in computer software through policies.

BACKGROUND OF THE INVENTION

When most people in the software industry refer to "security", they typically mean the security of network, operating system, and server. Organizations that wish to protect their systems against security attacks invest a lot of time, effort, and money ensuring that these three components are secure. Without this secure foundation, the system cannot operate securely.

However, even if the network, server, and operating system are fully secured, vulnerabilities in the software application itself make the system just as prone to dangerous attacks as unprotected networks, operating systems, and servers would. In fact, if an application has security vulnerabilities, it can allow an attacker to access'privileged data, delete critical data, and even break into the system and operate at the same priority level as the application. This essentially gives the attacker the power to destroy the entire system. Consequently, the security of the application is even more important than the security of the system on which it is running. Building an insecure application on top of a secure network, OS, and server is akin to building an elaborate fortress, but leaving the main entryway wide open and unguarded.

The ideal secured application is an application that is completely invulnerable to security attacks. Achieving this goal requires a detailed and specific understanding of the system in question, as well as the flexibility to address unusual or unknown circumstances. The main reason a tested system fails is that its testing didn't cover every component and did not consider every possible condition. An untested or lightly tested piece of code may execute in a way that the developers never intended, causing a security problem. Because of inefficiencies inherent in the most common methods of verifying application security, such as, penetration testing and/or static analysis testing designed to expose general security vulnerabilities, most software systems don't get tested properly.

Penetration testing involves manually or automatically trying to mimic an attacker's actions and verifying if any tested scenarios result in security breaches. Although it may sound helpful in theory, in practice, this approach is a very inefficient way of protecting the application and exposing its security problems. Basically, to expose a security vulnerability with penetration testing, the developer must be lucky enough to design (or generate) an attack scenario which will expose a security vulnerability in the application. Considering that there are thousands, if not millions, of possible scenarios for even a basic application, there is a small chance that the developer tests scenarios that expose any potential vulnerabilities, let alone identify all potential vulnerabilities. As a result, penetration testing consumes a lot of time and resources, but in the end, it doesn't deliver much assurance that the application is secured.

Furthermore, penetration testing may fail to catch the most dangerous types of problems. Let's assume that a web application needs to be tested. This application has a backdoor that gives administrative privileges to anyone who provides a password or a secret argument, such as, h4x0rzRgr8=true. A typical penetration test against a web application uses known exploits and sends modified requests to exploit common coding problems. It would take years for this test to find this kind of vulnerability through penetration testing. Even an expert security analyst would have a tough time trying to exploit this problem. For example, a difficult to reach section of the code in an error handling routine that performs an unsafe database query, or a lack of an effective audit trail for monitoring security functions are often entirely overlooked by even a diligent penetration test.

Another security related test scheme checks the application security from the perspective of the code, through static analysis. A static analysis engine looks for potentially dangerous function call patterns and tries to infer if they represent security vulnerabilities (for instance, to determine if code has invalidated inputs, and if invalidated inputs are passed to specific functions that can be vulnerable to attack).

This is an improvement over penetration testing because it has a greater chance of exposing vulnerabilities, however, there are still several problems with this method. First, these patterns don't consider the nuances of actual operation and they don't factor in business rules, or general security principles. For example, there is a serious security flaw in a web application that allows a customer to see other customers' accounts. However, this kind of problem escapes static analysis, because it doesn't involve a dangerous function call. Security assessment, in this sense, isn't always a bug to find, but a design problem to verify. Another problem with static analysis is false positives. Static analysis cannot actually exploit vulnerabilities; it can only report potential problems. Consequently, the developer or tester must review every reported error and then determine if it indicates a true problem, or a false positive.

Sophisticated static analysis methods can improve accuracy, but ultimately, a significant amount of time and resources must be spent reviewing and investigating reported problems and determining which actually need to be corrected.

Therefore, there is a need for a more efficient and effective approach to securing the application from the perspective of security breach prevention.

SUMMARY OF THE INVENTION

In one embodiment, the present invention is a method and system for enforcing functionality in computer software through policy. The method and system include converting a natural language policy to sample code, wherein the natural language policy is represented by logical patterns; creating one or more static analysis rules from the sample code to enforce the natural language policy at a centralized location of the computer software; and enforcing the created one or more static analysis rules for the computer software.

In one embodiment, the present invention is a method and system for enforcing functionality in computer software through policy. The method and system include selecting a natural language policy from a plurality of natural language policies, wherein each of the plurality of natural language policies is represented by logical patterns; converting the selected natural language policy to sample code; creating a static analysis rule from the sample code; and enforcing the created static analysis rule within the computer software.

DETAILED DESCRIPTION

In one embodiment, the present invention allows software developers to create and enforce a security policy that is customized and extensible. This adds a transparent layer of security testing and verification throughout the development process.

In one embodiment, the present invention defines, concentrates, and verifies security policies. A security policy is a document that defines how code should operate to maintain the degree of security that the organization requires for that system. Security policies are required for Sarbanes-Oxley compliance, therefore, defining and enforcing a security policy not only improves application security, but also, brings the developer one step closer to Sarbanes-Oxley compliance.

A security policy involves defining how the code needs to be written so that is not vulnerable to attacks. This policy should be designed to prevent both possible types of security bugs (bugs in the code that cause security mechanisms to malfunction), and security mechanisms that aren't implemented correctly. The first case tends to be a problem when critical security tasks such as input validation or authentication are handled differently in different parts of the code. Not only is this bad for maintainability of the software, it is also bad for security because it introduces more attack to surface where vulnerabilities can hide.

In one embodiment, all security-related operations specified in the security policy are concentrated in one segment of the application, for example, one branch of the logical flow of the application. A developer can then focus her resources on verifying and maintaining the security of that one critical module. This centralized security policy acts like a drawbridge for a castle, isolating the areas that attackers can exploit and allows for a more focused defensive strategy.

When the security policy is concentrated in one segment of the application and centralized, one can use static analysis tools to enforce this policy by scanning code and checking whether it matches patterns that indicate violations of the defined security requirements. This scanning can be performed for traditional programming languages such as C/C++, Java, and .NET languages (including C#, VB.NET, and Managed C++), as well as scripting languages, such as PHP, Perl, and ColdFusion. In many cases, the static analysis tool can automatically correct the code so that it complies with the security policy. Identifying and removing security vulnerabilities in this manner takes a short time. This provides an opportunity to make significant security improvements with minimal resources.

Figure 1:
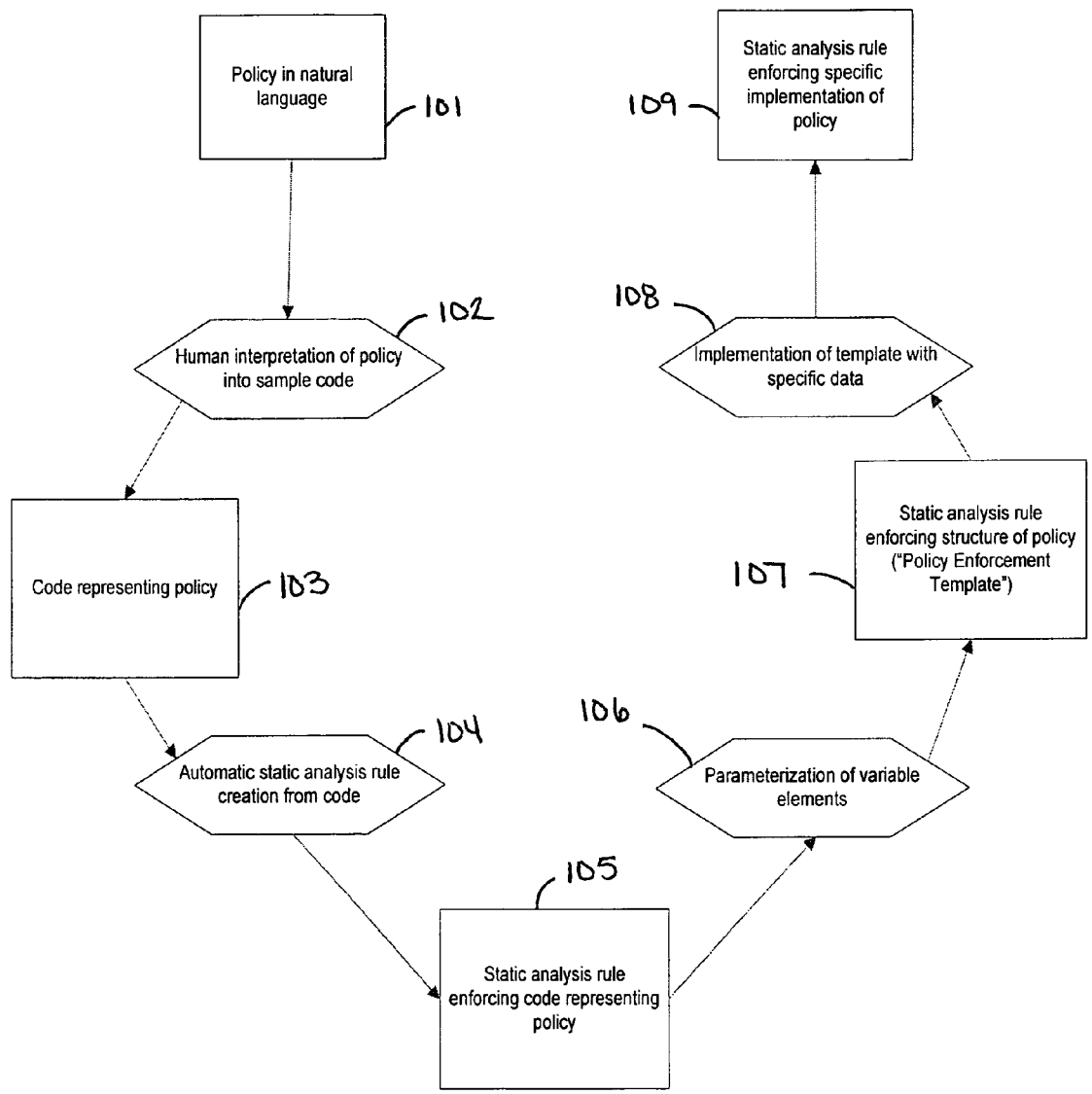
FIG. 1 is an exemplary process flow diagram for enforcing policies using static analysis, according to one embodiment of the present invention.

FIG. 1 is an exemplary process flow diagram for enforcing policies using static analysis, according to one embodiment of the present invention. A natural language policy 101 is converted into sample code 103 through an interpretation of the policies 102. Then, in block 104, static analysis rules are created, for example, by automated static analysis rule creation (such as CodeWizard™ tool by Parasoft Corp.™) on the sample code which represents the policy. The created static analysis rules 105 enforce code that represents the policy. A policy by itself, does not provide a means for its own enforcement. Thus, a static analysis rule needs to be devised to enforce the policy. This rule should identify code which does not conform to the policy. The rule may be edited to apply to general cases (for example, get rid of variable names, etc). By running this rule, one can find all separate instance of the violation.

The rules can be created from snippets (sample portion) of the code. In one embodiment, an example of the code that is representative of the custom rule to be enforced is used. This code would be fed to a product engine, which would then parse the code and represent the code as a parse tree to generate a rule that looks for the specified pattern. This rule can then be used to scan the rest of the code and enforce the pattern across the application and find any violations of that rule. The advantage of using snippets is that more complex policies that can't be simply parameterized can be created. For example, if an application calls for something in a certain sequence, then the user can automatically create a rule of arbitrary complexity very quickly using snippets. The snippets make it much more efficient to create these policies of arbitrary complexity.

Variable elements of the created rules are substituted with parameters in block 106. The result is a policy enforcement template 107. The parameters are then replaced with expressions to match specific data related to the application, in block 108. One or more static analysis rules to enforce the natural language policy are then created, in block 109. The created rules are then enforced by static analysis tools.

In one embodiment, the present invention converts the natural language policy to sample code (snippets) through the following process:
  a. Distill fundamental invariants of policy violation into pseudocode.
  b. Use temporary variable name placeholders (these will later be parameterized) to expand pseudocode into syntactically correct code.

As an example, given the policy "All security-critical functions should be centralized," the following sample code is generated:

```
a.
    not centralized method {
        security critical function
    }
b.
    nonCentralizedMethodName( ) {
        securityCriticalFunction( );
    }
```

Figure 2:
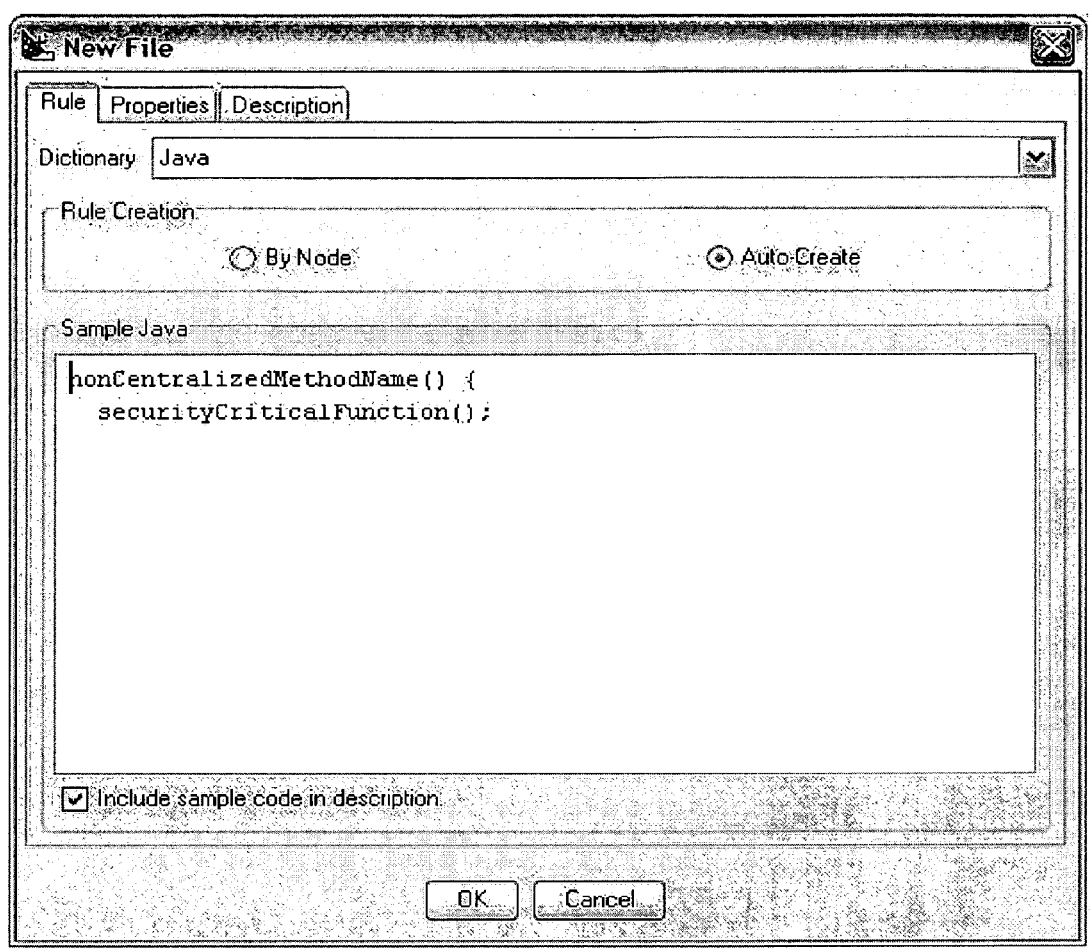
FIG. 2 is an exemplary GUI for converting a sample code to a rule using an automatic rule generation tool, according to one embodiment of the present invention.

The sample code is converted to a rule using the automatic rule generation functionality (for example "snippets" function of CodeWizard'), as shown in FIG. 2.

Figure 3:
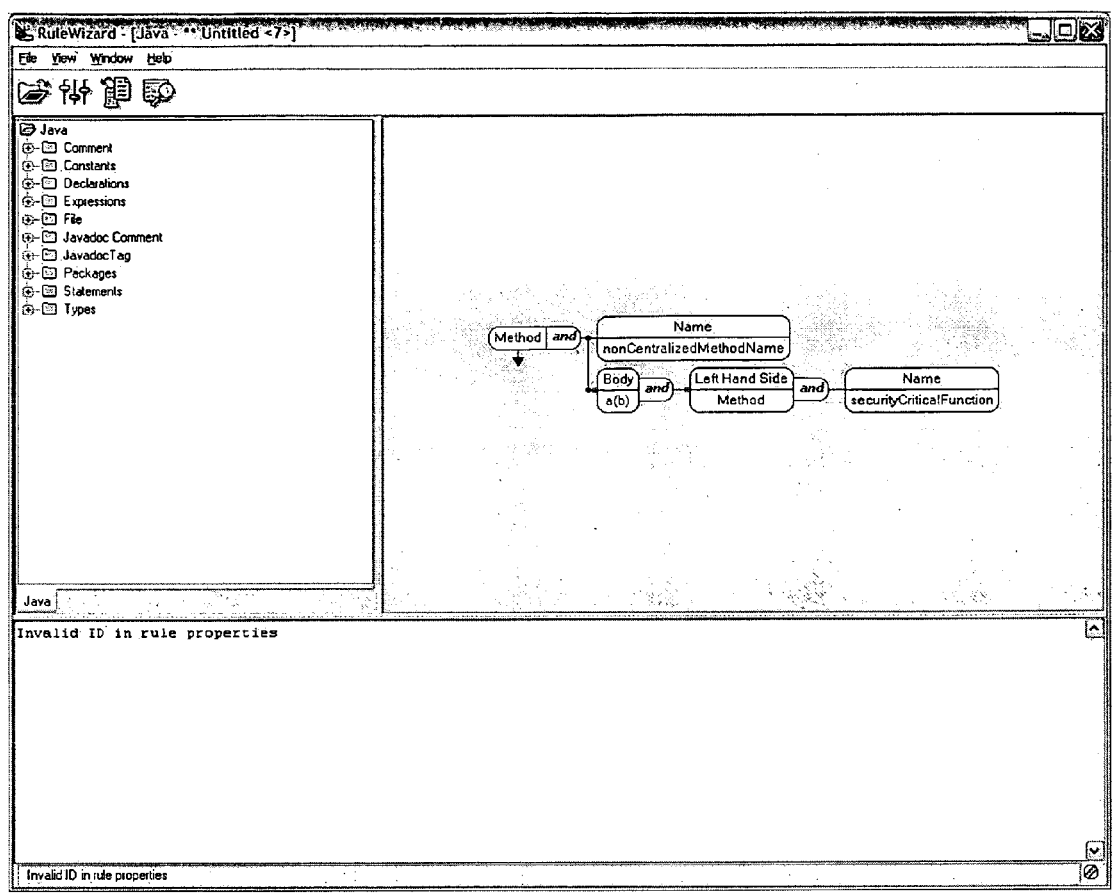
FIG. 3 illustrates an example of a template for centralizing method calls, according to one embodiment of the present invention.

FIG. 3 illustrates an example of a template for centralizing method calls. This template can be modified to enforce centralization of any functionality, that is a general policy.

Figure 4:
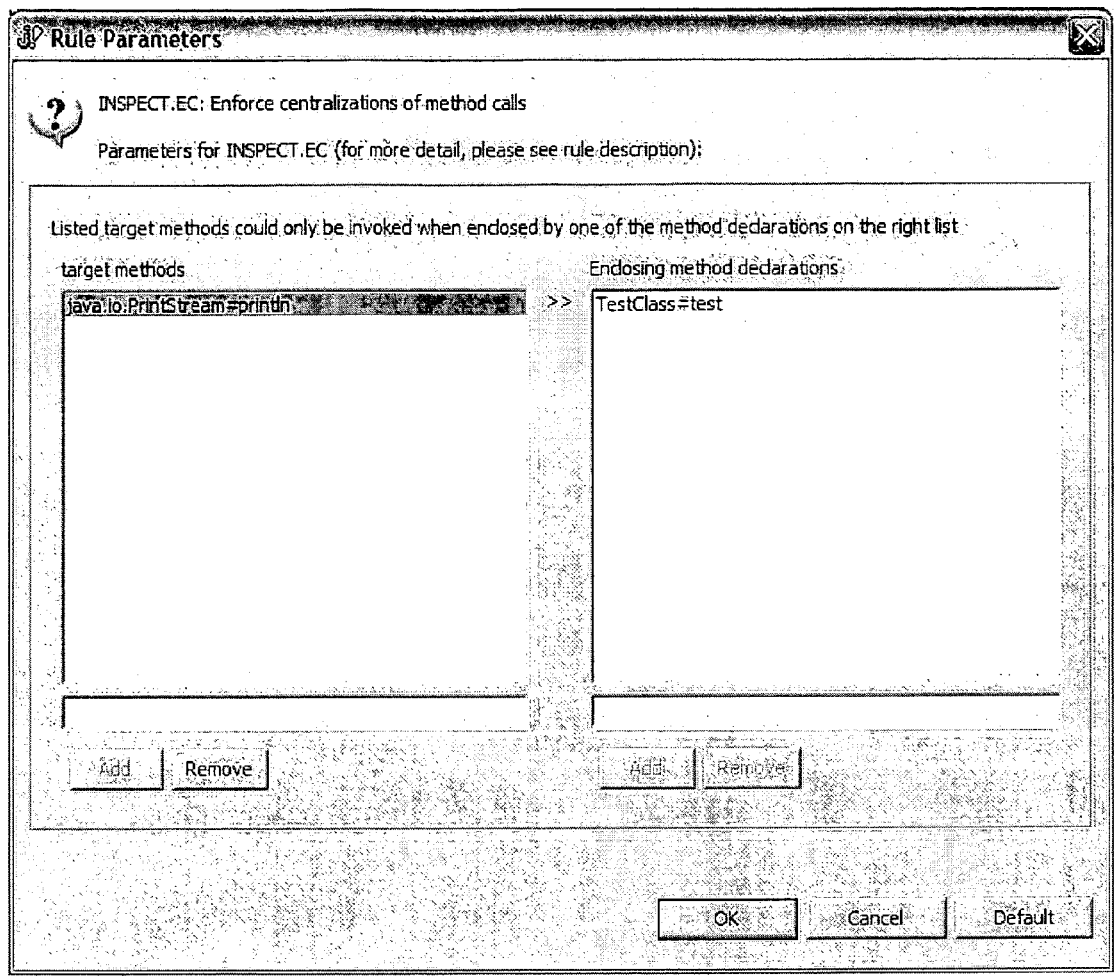
FIG. 4 is an exemplary GUI for substituting variable elements of the created rule with parameters, according to one embodiment of the present invention.

As shown in FIG. 4, variable elements of the created rule are substituted with parameters because different applications may have different variable elements such as, functions names specific to the application. The created rules are then enforced by static analysis tools. These tools enforce the policy via static analysis of rules. The rules can be out-of-the-box, parameterized, or customized for the application.

After the rule is verified and enforced through static analysis, penetration testing can be used to confirm that the security policy is implemented correctly and operates properly. When penetration testing performed for confirmation, rather than as the main security bug-finding, it can provide reasonable assurance of the application's security after it has verified just several paths through each security-related function.

Although the invention utilizes penetration testing, this is only a starting point (not an endpoint) for an exhaustive and effective security process. The invention performs penetration testing to demonstrate that the application being tested does indeed have security vulnerabilities. When a vulnerability is uncovered with penetration testing, it is likely that there are many other vulnerabilities existing in the application. This can be a strong demonstration point that the application has a security problem.

Appendix A includes an exemplary list of code vulnerability signatures from some leading experts, the entire contents of which is hereby incorporated by reference. Each is a tried and true technique for avoiding certain types of security vulnerabilities at the code level. These rules run out-of-the-box to find and fix common security errors and can quickly clean code. These rule don't necessarily prevent breaches from happening but are the first step in ensuring that breaches are harder to exploit.

Appendix B includes exemplary security policies that may be used by the present invention to enforce functionality in the application code, the entire contents of which is hereby incorporated by reference. These policies are typically best practices which are too general to implement as an out-of-the-box rule, and require simple parameterization based on the specific implementation of functionality in an organization. These policies should be modified to fit the application and then run to find inconsistencies and errors which create security vulnerabilities.

These policies fill in the gaps in the security coding guidelines of Appendix A by discussing functional, rather than just code-level issues. These functional issues typically are addressed differently by different development groups using their own design methodologies. However, the principles behind the policies remain very similar. Thus, while these policies typically need parameterization in accordance with the functional makeup of a project, once implemented, they become powerful policies that create the baseline for centralized and consistent security mechanisms (for example, authentication, access control, auditing, etc), as well as guidelines for protecting the security mechanisms from being exploited. Although these policies may be enforced slightly differently in the different languages, because they are cross-cutting and not language specific, these differences are ignored.

The policies should be logically specific enough to be written at a code-level, and general enough to be reusable. Examples of policies which are general are "Keep this data private" or "Use minimal memory resources". In other words, a policy needs to convey a specific method or behavior, rather than a desired result.

Securing application code involves determining the current application security policy, that is, the guidelines defined for ensuring that the proper security mechanisms are in place to protect application resources. In one embodiment, the present invention maintains a security policy that can be modified and improved by the users. This security policy includes the types of resources that require privileged access, the kind of actions that should be logged, the kind of inputs that should be validated, and other security concerns specific to the application.

The security policy also provides a framework for automating the process of enforcing security constraints. The security policy includes patterns that are based on the range of categories pertaining to best practices in application security. This core set of rules is supplemented with application-specific rules that address an organization's specific security concerns. This process results in the creation of a document which enforces the centralization of security mechanisms, prevents coding problems that can lead to security vulnerabilities, and details custom security requirements.

To ensure that all team code complies with the security policy consistently, the static analysis rule set is customized to detect policy violations. By customizing the static analysis, specific security best practices such as, sensitive function logging and proper access control can be enforced according to business rules. This reduces the amount of false positives and provides a more sophisticated level of policy enforcement than standard source code analysis.

Once these static analysis rules have been implemented to enforce the security policy, they are included in a static analysis configuration and can be run unobtrusively as part of an automated nightly test build to ensure that violations are identified as soon as they are introduced. By referring to the security policy, developers can understand why these violations are security vulnerabilities, as well as how to fix the problem and secure the code.

Because Java is a strongly-typed, sandboxed platform, it is a common choice for applications which require a high level of security. However, C or C++ code is often necessary and needs to be analyzed for security concerns as well. Using a similar approach, policies can be customized to enforce secure coding standards for preventing problems unique to C-style languages such as, buffer overflow, format string attacks, and memory leaks. Other languages may be analyzed for security concerns using a similar approach.

The security policy of the present invention enforces the centralization of certain security functions to ensure that there is only a single point of failure in critical actions, such as, authentication, input validation, and encryption. These important functions are preferably centralized, for example, put in the branch that includes the function which accepts user inputs.

Once the application is up and running, a penetration test is performed on the system. Analyzing how the application responds to attacks simulated during penetration testing can help developers determine the effectiveness of the overall security policy.

One key advantage of performing penetration testing with Web testing tools (such as, WebKing™ offered by Parasoft™ Corp.) is that the tool allows the developers to perform a security assessment for applications written in scripting languages which are difficult to analyze statically. PHP, Perl, and ColdFusion are languages that are primarily used for simple or internal web applications without focusing on security, but can leave holes in a network. Because WebKing™ interacts through the interface of the running application, it can test the security of any web-enabled application, regardless of the server-side implementation.

Generally, a penetration test which reveals a single security vulnerability leads to the specific vulnerability being fixed, while similar vulnerabilities scattered throughout the code are left untouched. Because of the centralization enforced by the security policy, any security vulnerabilities that WebKing™ finds will point to a single flaw in the source code. Fixing this single flaw will remove the vulnerability for all cases, so a single correction may actually resolve or prevent many security vulnerabilities.

Individual penetration tests that identify security vulnerabilities, as well as the passed tests, can be added to a regression suite that alerts the team immediately, if code modifications reintroduce previously-corrected security vulnerabilities or introduce new ones. The static analysis security rules are also added to the regression tests (executed, for example, nightly) so that the source code repository is automatically scanned in the background (for example, each night) to verify whether all new code complies with existing security policies. This automated testing allows for the effective mitigation of security vulnerabilities and provides documented proof (such as that required for Sarbanes-Oxley compliance) that application security has been enforced.

Figure 5:
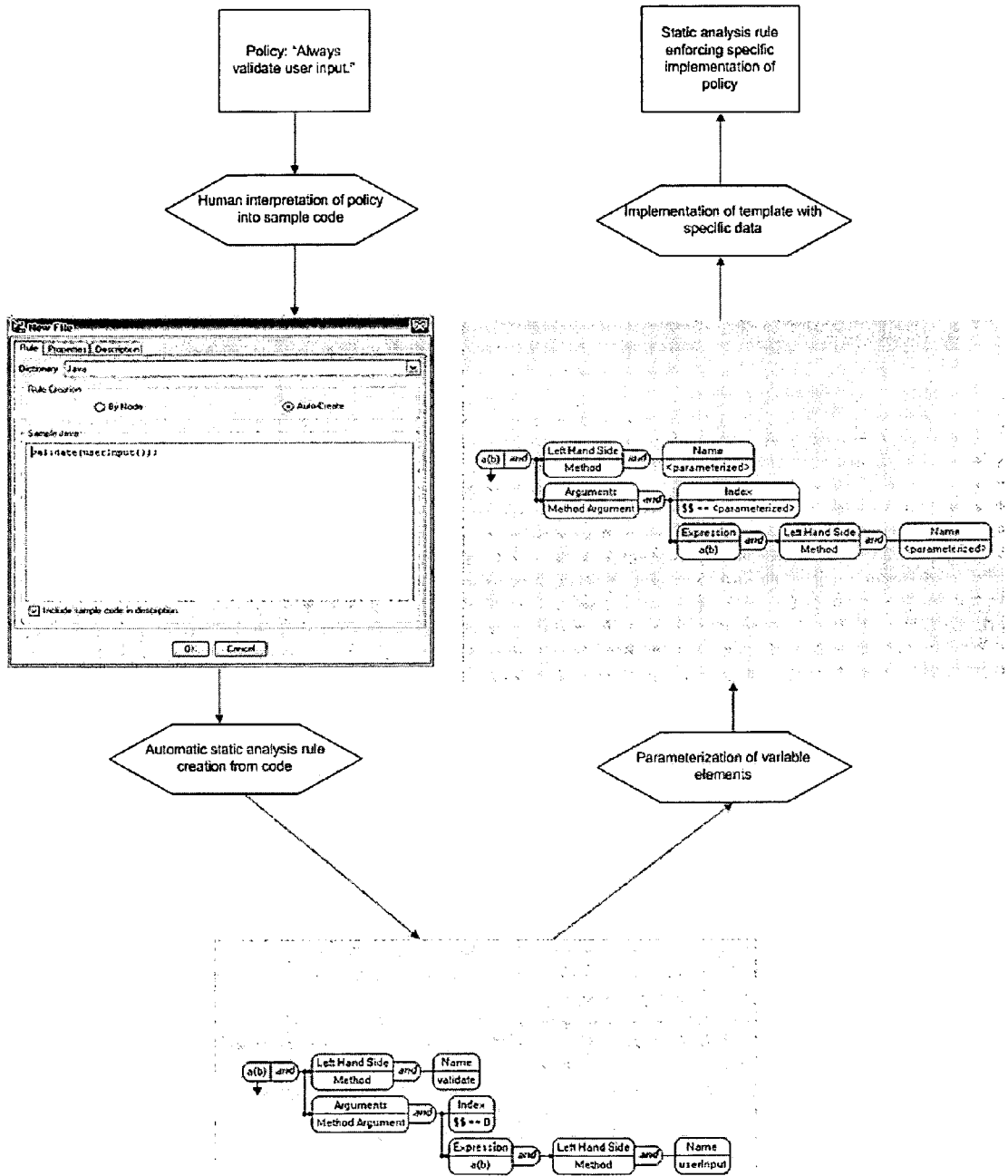
FIG. 5 illustrates an example of how a policy is codified and enforced, according to one embodiment of the present invention.

FIG. 5 illustrates an example of how a policy of "Always validate user input" is codified and enforced.

The policy of "Always validate user input" represents the practice or pattern that needs to be enforced through static analysis. The exemplary policy of validating user input is meant to enforce the checking of user input for valid values so that application behavior can be modeled on expected input, which is an important component of security Interpretation of policy into sample code process involves distillation of the logical mechanism represented by the policy. There are general interpretations that can be applied for different logical patterns, for example:

Encapsulation: Always'perform a function within the context of another function. For example, always log data access.

Centralization: Enforce a centralized functionality. For example, perform database access in only one method, and call that method from the code.

Consistency: Always begin or end a function with another function. For example, always terminate network connections.

Preference: Use one function instead of another. For example, prefer secure cookies to regular cookies.

These and other general logical patterns can be used to represent a natural language policy. Here, validating user input is an encapsulation mechanism.

After determining the logical mechanism, the negation of that pattern is represented as code with placeholders for variable names. The negation is a machine-readable code construct that violates all the essential invariants and represents a falsification of the policy. A negation of user input always being validated is represented as code where a user input returning method is not encapsulated by a validation method.

Rules representing the policy are then automatically generated. By using the ability of a test tool, such as, Jtest™ to create snippets, a rule is generated using the code. These created rules find any occurrences of the specific code and mark a violation.

The variable elements in the created rule are then parameterized. In the rule, the variable elements that were used as placeholders are parameterized so that they can be replaced by regular expressions of application-specific data.

The rule now requires user-input which can be determined from the original policy and any application-specific conventions. For example, validating user input is divided into two mechanisms which are parameterized: functions which return user input, and functions which validate user input.

By supplying this data per specification of the application, the policy can be applied as a static analysis rule. A static analysis rule now enforces the natural-language policy according to the user-supplied coding conventions.

In the above example, rather than validating the user input in many hard-to-determine branches of the application, the invention validates the user inputs at their source, that is, those function(s) that return user input. This way, the validation is centralized at its source in the application. In other words, no user input finds its way to the application unless it is validated at its centralized source.

In one embodiment, the present invention includes a computer implemented process for protecting the assets of application by identifying and preventing vulnerabilities in the business logic of the application. The process includes identifying the assets of an application, determining how these assets are vulnerable to attack or misuse then, creating policies to ensure that these threats are mitigated.

It is possible that some people who pose a security risk to identify key resources such as credit card numbers, personal data, or other assets, and attempt to exploit them by taking advantage of lax security in business processes. In many of the real-world cases of large-scale data breaches, the mistakes that organizations made were based on insecure business practices, which allowed insiders and outsiders alike to gain access to valuable resources and information. For example, the following incidents are actual data security breaches reported by various organizations.

Credit card numbers stored for research purposes were accessed by insiders.

Criminals posing as legitimate businesses accessed critical personal data.

A laptop containing sensitive information was stolen.

In each of these cases, the application had a logical or design flaw that caused the vulnerability. For example, the application was unnecessarily storing sensitive data in a file, allowing illegitimate businesses to register accounts, and/or allowing users to locally cache valuable data.

The problems above are based on a myopic view of functionality from the development team, which doesn't take into account the malicious intentions of users, both internal and external. In order to secure a system against these threats, it is important to be able to set in place defense against logical exploitation which actually checks the validity of actions and defends against malicious use. These threats can be identified simply by thinking evilly and understanding how valuable resources can be exploited.

Figure 6A:
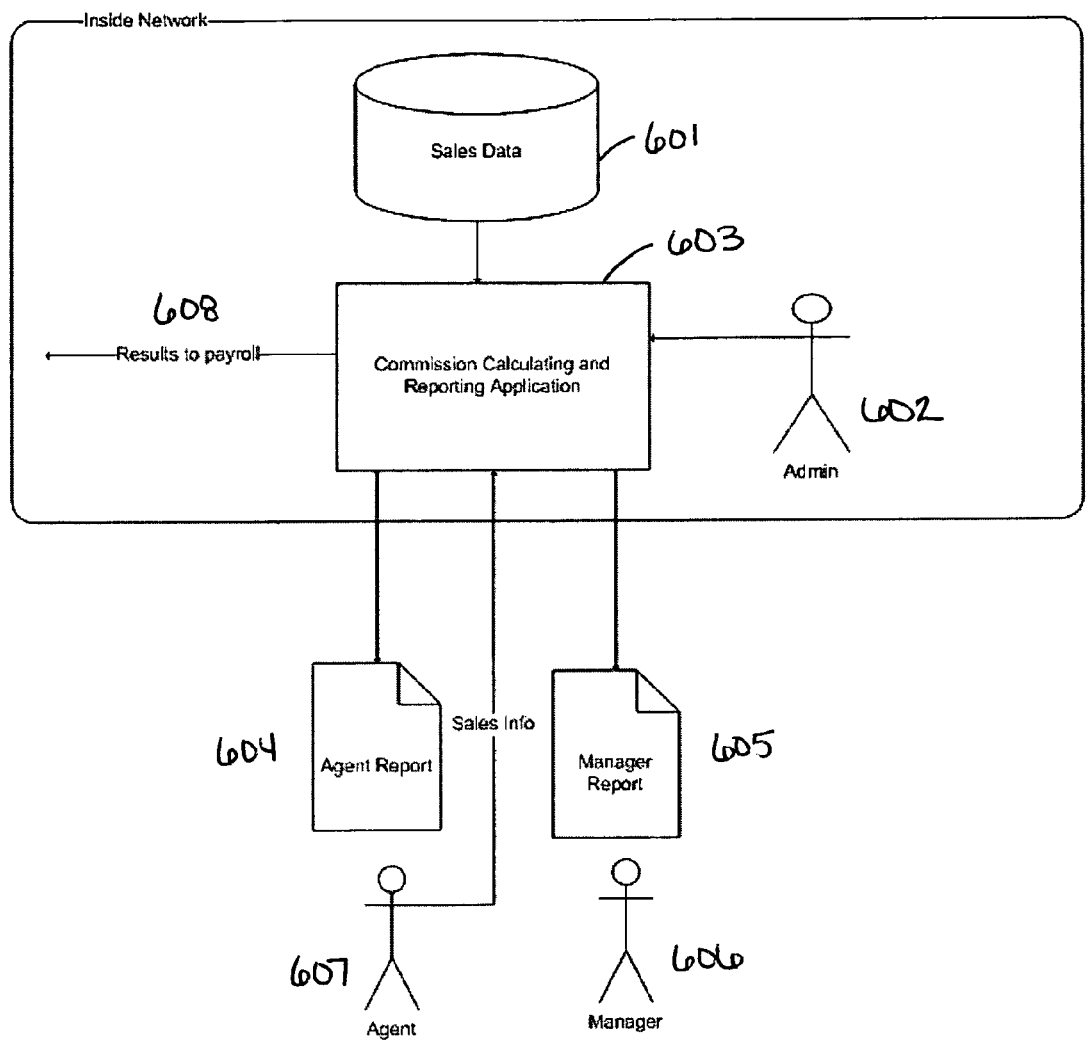
FIG. 6A shows a basic architecture of an exemplary software application.
Figure 6B:
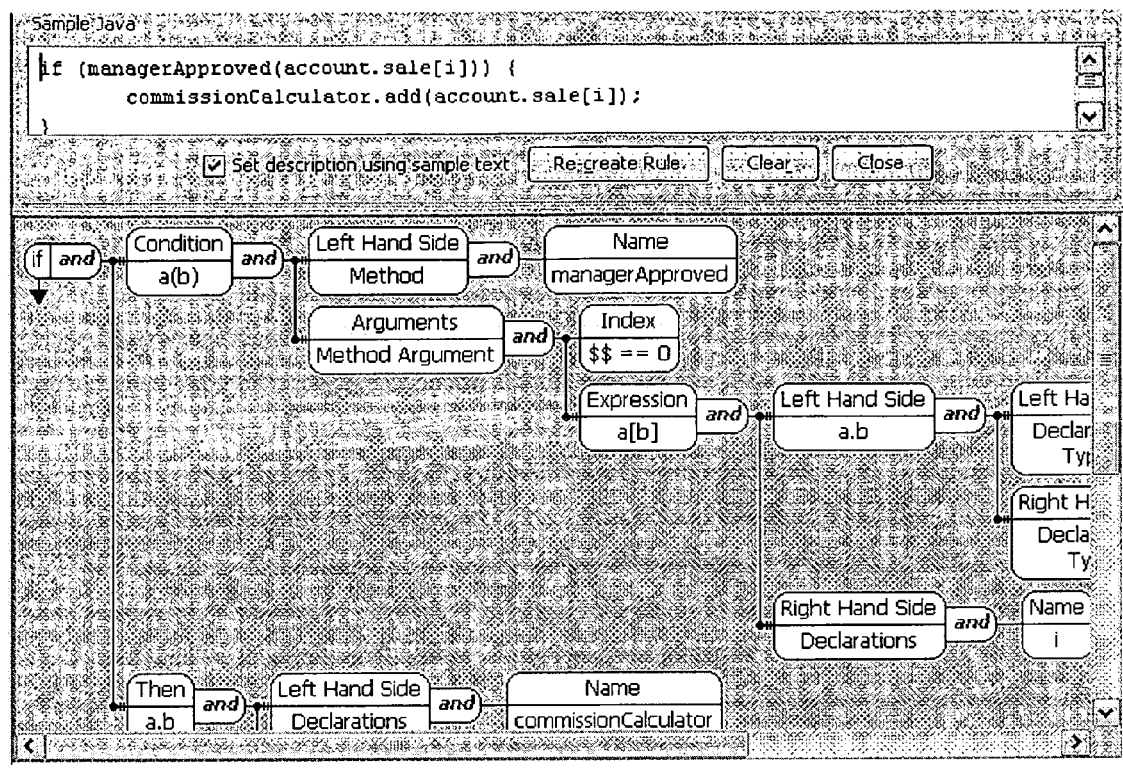
FIG. 6B is an exemplary GUI for a method in the exemplary software application of FIG. 6A.

FIGS. 6A-6B illustrate an example of an insurance company which has a software application that computes agents' commissions and provides reporting data. This exemplary system has common security controls in place such as those described in Appendix A and Appendix B.

FIG. 6A shows a basic architecture of the above-mentioned software application. Database 601 stores sales and related data. An administrator 602 executes software application 603 to generate agent report 604 and manager report 605 for agent 607 and manager 606, respectively.

First, the assets of the software application 603 need to be examined. The assets include: sales data 601, commission processing results 608, administrative interface, agent reports 604, manager reports 605, and the like. Each of these assets has a security value and should be protected in addition to the standard mechanisms (passwords, access control, etc) against exploitation of the sales data by a hacker. For example, an unscrupulous sales person may attempt to submit a sale that has not been properly "vetted" and may not actually represent a valid sale.

A requirement to mitigate the threat mentioned above is: "Each sales order submitted by an agent needs to be approved by the agent's manager before being processed in the commission calculation". This control provides a clear chain of responsibility and visibility by making sure that managers are accountable for their staff of agents. However, this requirement should not be implemented outside the application, rather, the application should enforce the requirement.

Devising the above security requirement is important, however, it needs to be upheld every time and every place. Therefore, the identified requirement is implemented as a policy. The policy in this case could be: "Sales objects need to be verified by the management approval service before being added to the commission processing queue." Just as with any other security policy, this provides a mechanism to disseminate the policy to developers, testers, and auditors. More importantly, it provides a method for automating enforcement of the policy in the code.

Rules are then created accordingly to enforce the above policy. One reason for the difficulty of enforcing a policy is that the logic of the policy is dependent on the architecture, language, platform, and technologies of the specific project (application). It is noted that the enforcement engine can quickly verify the placement/presence of arbitrarily complex pieces and patterns of code. This means that as long as one can describe the functionality/policy in the form of code in the application, the policy can be enforced just as any other coding rule.

In one embodiment, the auto-creation of static analysis rules is accomplished by placing the copying and pasting the snippets into an auto-create wizard of an automatic Rule creator tool, such as CodeWizard™. This way, rules can be instantaneously created to enforce the presence, absence, or context of the code throughout the application. The created rules can be quickly modified so that only important similarities (classes, methods, parameters, order of ops, etc) are maintained and unimportant differences (variable names) are disregarded.

In this example, the manager approval policy is considered in a generic implementation. It is known that a digital signature from the manger (for the specific transaction, a separate requirement) is submitted to the database 601 before adding the sale to the commission processing calculation 603. This signature is verified in a method name managerApproved, depicted in graphical user interface (GUI) in FIG. 6B. The commissionCalculator.add method adds sales to the calculation of a sales commission. The policy enforcement engine would then verify that the batch processing job functions like:

```
if (managerApproved(account.sale[i])) {
    commissionCalculator.add(account.sale[i]);
}
```

Furthermore, actions outside the above check should be disallowed by:

```
commisionCalculator.add(account.sale[i]);    //VIOLATION
```

By enforcing this policy, in addition to simply fixing a bug or preventing an error, a critical defense to the functionality of the application is verified from the inside out.

Again, in the above example, rather than validating manager's signature for each sales order in many hard-to-determine branches of the application, the invention validates the manager's signature at its source, that is, those function(s) that return sales order. This way, the validation is centralized at its source in the application. In other words, no sales order finds its way to the application unless it is validated for manager's signature at its centralized source.

Another example of how security policies prevent real security vulnerabilities is now described. Certain processes (quota comparisons, performance reviews) rely on accurate reports generated by the commission application 603. Perhaps an Agent 607 or Manager 606 would try to modify the report after it was generated to show that certain quotas had been met. One need to verify that the report is authentic.

First, a security requirement is determined. In order to prevent a user from spoofing a report, one needs to have a record of all reports issued including digital signature of the report to verify that it has not been modified.

Next, a security policy is created. Every time a report is issued, a signature (ID and checksum) need to be inserted in the database to verify that the report was issued by the system and was not modified. Rules are then created based on the security policy to enforce the created policy. The methods are enumerated for creating a report (createManagerReport, createAgentReport, etc.) and they are verified so that they call the signature storage algorithm (createSignature).

```
public Report createAgentReport( ) {
    createSignature(report.id, getHash(report));
}
and
public Report createManagerReport( ) {
    createSignature(report.id, getHash(report));
}
``` and, the following method body would be in violation

```
public Report createSpecialAgentReport {
    //VIOLATION: No call to createSignature
}
```

These policies are effective for enforcing the security requirements of a project, but can also be abstracted further. They could be adaptable and extendable to other projects as an organization-wide policy. For instance, one could verify that all reports have to create a signature by invoking the createSignature service. This type of service-oriented governance offers a flexible method for securing business processes by allowing separation of concerns and maintaining best practices across enterprise applications.

Figure 7:
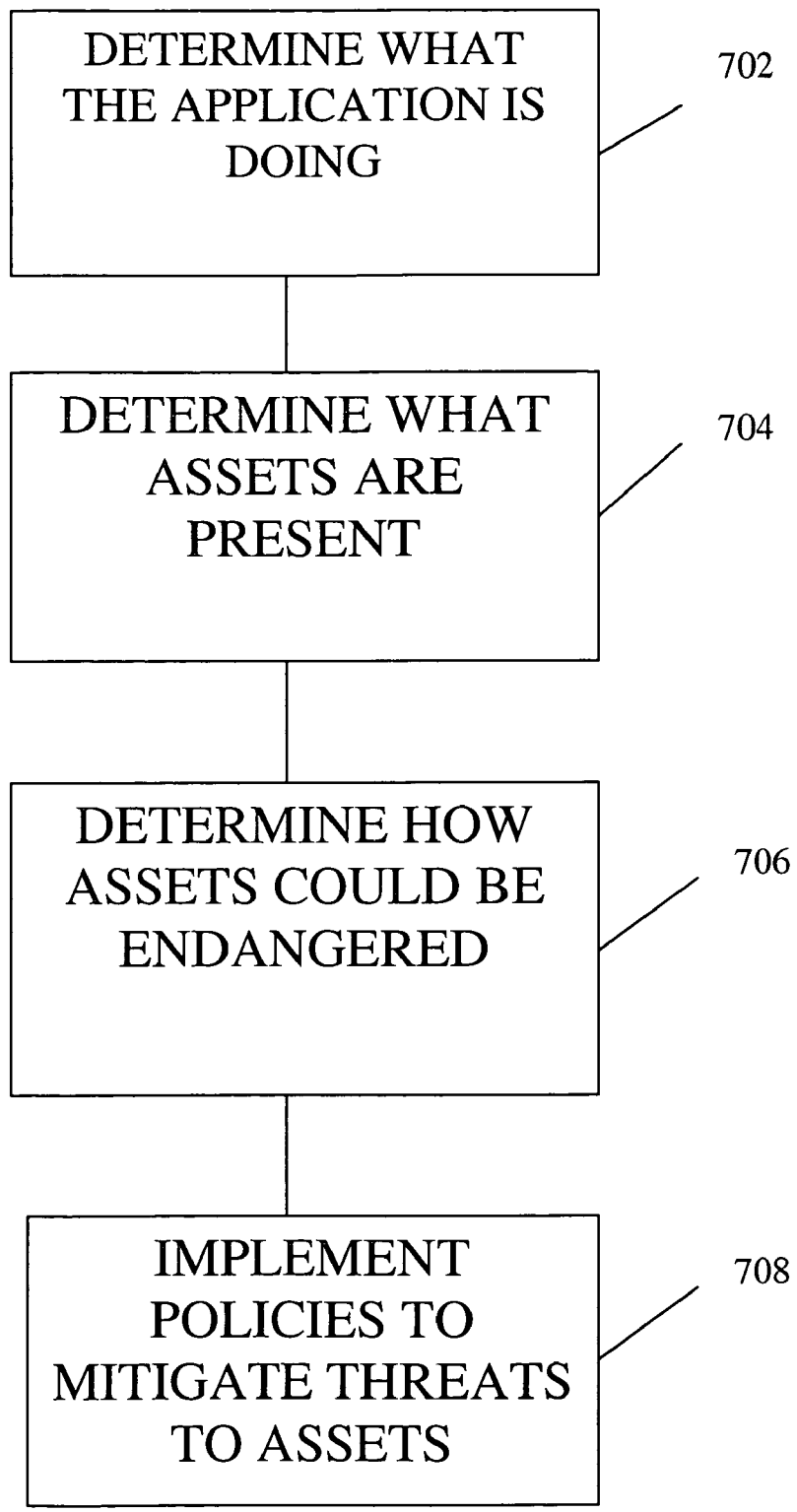
FIG. 7 is an exemplary process flow for identifying and defending threats to the logic of a software application, according to one embodiment of the present invention.

FIG. 7 is an exemplary process flow for identifying and defending threats to the logic of a software application, according to one embodiment of the present invention. In block 702, it is determined what the application is doing. This process determines how to defend the logic of the application by understanding the functionality that the application offers. For example, whether the application processes financial transactions, the kinds of personal data that are stored, what the administrative interface provides, and the like. Understanding of what the application is doing provides a framework to analyze the security issues of the application. One of the result of this step is a model of the business processes being performed by the application.

In block 704, the valuable assets related to the application are determined. The determined assets can be data such as personal information or financial records, functionalities such as a processing service or a proprietary algorithm, or principles such as the quality of information provided or corporate reputation. These assets need to have value and be accessible in some way to the user. They represent the target of a malicious user or attacker.

In block 706, the way the assets could be endangered is determined. Now that what the application is offering in terms of functionality as well as assets is determined, it can be deduced what a hacker would try to exploit in the application. For example, if the hacker steals, modifies or deletes the personal data. Additionally, if the hacker makes the application function incorrectly to damage corporate reputations, or tries to subvert the application to cause harm to other users.

In block 708, policies to mitigate threats to assets are implemented. Now the focus shifts to solving the problem, or mitigating the threat. This process requires that appropriate controls (countermeasures) be put into the code to prevent the logical exploitation of the threat. This process provides the capability to enforce the use and placement of application-specific defensive countermeasures in the code using the same enforcement engine as the policies.

By including the extended security policy described above, a security policy becomes more than a guideline for developers for general secure coding; it becomes a business-level approach to ensuring the security interests of the organization.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for enforcing functionality in computer software through policy, the method comprising:

creating a natural language policy to define how the computer software should be operating to achieve a predetermined level of security or functionality;

converting the natural language policy to a sample code template including variable name placeholders, wherein the natural language policy is represented by logical patterns enforcing centralization of critical functionality of the policy in the computer software to enforce execution of the critical functions at their centralized sources in a source code of the computer software;

automatically creating one or more static analysis rules from the sample code template to identify code in the computer software which does not conform to the natural language policy;

substituting the variable name placeholders in the sample code template with parameters from the computer software; and electronically enforcing the created one or more static analysis rules for the computer software to check whether any code in the computer software matches patterns that indicate violations of the natural language policy.

2. The method of claim 1, wherein the converting a natural language policy to sample code template comprises distilling invariants of violations of the policy into pseudocode; and using temporary variable name placeholders to expand pseudocode into syntactically correct sample code template.

3. The method of claim 1, wherein the creating one or more static analysis rules comprises negating the logical patterns of the natural language policy to represent code with placeholders for variable names, wherein the negation is a machine-readable code construct that represents a falsification of the policy.

4. The method of claim 3, wherein the negation violates all essential invariants of the sample code template.

5. The method of claim 1, wherein the electronically enforcing the created one or more static analysis rules comprises parameterizing variable elements in the created rules used as placeholders.

6. The method of claim 1, further comprising performing penetration testing on the computer software.

7. The method of claim 1, further comprising performing unit testing on the computer software.

8. The method of claim 1, wherein the converting a natural language policy to sample code template comprises applying one or more of the group encapsulation, centralization, consistency, and preference to the logical patterns.

9. A computer readable storage medium having stored thereon a set of instructions including instructions for enforcing functionality in computer software through policy the instructions, when executed by one or more computers, cause the one or more computers to perform the steps of:

creating a natural language policy to define how the computer software should be operating to achieve a predetermined level of security or functionality;

converting the natural language policy to a sample code template including variable name placeholders, wherein the natural language policy is represented by logical patterns enforcing centralization of critical functionality of the policy in the computer software to enforce execution of the critical functions at their centralized sources in a source code of the computer software;

automatically creating one or more static analysis rules from the sample code template to identify code in the computer software which does not conform to the natural language policy;

substituting the variable name placeholders in the sample code template with parameters from the computer software; and electronically enforcing the created one or more static analysis rules for the computer software to check whether any code in the computer software matches patterns that indicate violations of the natural language policy.

10. The storage medium of claim 9, wherein the converting a natural language policy to sample code template comprises distilling invariants of violations of the policy into pseudocode; and using temporary variable name placeholders to expand pseudocode into syntactically correct sample code template.

11. The storage medium of claim 9, wherein the creating one or more static analysis rules comprises negating the logical patterns of the natural language policy to represent code with placeholders for variable names, wherein the negation is a machine-readable code construct that represents a falsification of the policy.

12. The storage medium of claim 11, wherein the negation violates all essential invariants of the sample code template.

13. The storage medium of claim 9, wherein the enforcing the created one or more static analysis rules comprises parameterizing variable elements in the created rules used as placeholders.

14. The storage medium of claim 9, further comprising instructions, when executed by one or more computers, cause the one or more computers to perform the steps of performing penetration testing on the computer software.

15. The storage medium of claim 9, further comprising instructions, when executed by one or more computers, cause the one or more computers to perform the steps of performing unit testing on the computer software.

16. The storage medium of claim 9, wherein the converting a natural language policy to sample code template comprises applying one or more of the group encapsulation, centralization, consistency, and preference to the logical patterns.

17. A computer implemented method for enforcing functionality in computer software through policy, the method comprising:
electronically selecting a natural language policy from a plurality of natural language policies, wherein each of the plurality of natural language policies is represented by logical patterns enforcing critical functionality of the policy in the computer software to enforce execution of the critical functions at their centralized sources in a source code of the computer software;
converting the selected natural language policy to a sample code template including variable name placeholders;
creating a static analysis rule from the sample code template to identify code in the computer software which does not conform to the natural language policy;
substituting the variable name placeholders in the sample code template with parameters from the computer software; and
electronically enforcing the created static analysis rule to test the natural language policy within the computer software.

18. The method of claim 17, wherein the converting a natural language policy to sample code template comprises distilling invariants of violations of the policy into pseudocode; and using temporary variable name placeholders to expand pseudocode into syntactically correct sample code template.

19. The method of claim 17, wherein the creating one or more static analysis rules comprises negating the logical patterns of the natural language policy to represent code with placeholders for variable names, wherein the negation is a machine-readable code construct that represents a falsification of the policy.

20. The method of claim 19, wherein the negation violates all essential invariants of the sample code template.

* * * * *